United States Patent
Myaeng et al.

(10) Patent No.: US 8,452,798 B2
(45) Date of Patent: May 28, 2013

(54) QUERY AND DOCUMENT TOPIC CATEGORY TRANSITION ANALYSIS SYSTEM AND METHOD AND QUERY EXPANSION-BASED INFORMATION RETRIEVAL SYSTEM AND METHOD

(75) Inventors: Sung Hyon Myaeng, Daejeon (KR); Yu Chul Jung, Daegu (KR); Kyung Min Kim, Busan (KR)

(73) Assignee: Korea Advanced Institute of Science and Technology, Dae-Jeon (KR)

( * ) Notice: Subject to any disclaimer, the term of this patent is extended or adjusted under 35 U.S.C. 154(b) by 633 days.

(21) Appl. No.: 12/706,826

(22) Filed: Feb. 17, 2010

(65) Prior Publication Data
US 2011/0047161 A1 Feb. 24, 2011

(30) Foreign Application Priority Data
Mar. 26, 2009 (KR) .................. 10-2009-0025759

(51) Int. Cl.
G06F 7/00 (2006.01)
G06F 17/30 (2006.01)

(52) U.S. Cl.
USPC .......................................... 707/768

(58) Field of Classification Search
USPC ........................................... 707/768
See application file for complete search history.

(56) References Cited

U.S. PATENT DOCUMENTS

| | | | |
|---|---|---|---|
| 6,182,066 B1 | 1/2001 | Marques | |
| 6,701,305 B1 * | 3/2004 | Holt et al. ...................... | 706/45 |
| 7,769,751 B1 * | 8/2010 | Wu et al. ....................... | 707/728 |
| 7,814,085 B1 * | 10/2010 | Pfleger et al. ................. | 707/708 |
| 2007/0005646 A1 * | 1/2007 | Dumais et al. ............. | 707/104.1 |
| 2007/0239707 A1 * | 10/2007 | Collins et al. ...................... | 707/5 |
| 2009/0125505 A1 * | 5/2009 | Bhalotia et al. .................... | 707/5 |
| 2010/0161605 A1 * | 6/2010 | Gabrilovich et al. ......... | 707/736 |

FOREIGN PATENT DOCUMENTS

| | | |
|---|---|---|
| KR | 1020070008991 | 1/2007 |
| KR | 1020070040162 | 4/2007 |
| KR | 1020080096887 | 11/2008 |
| KR | 1020090000010 | 1/2009 |
| KR | 1020090010752 | 1/2009 |
| KR | 1020090013367 | 2/2009 |
| WO | WO2007/005465 | 1/2007 |

OTHER PUBLICATIONS

"Analysis of Topic Dynamics in Web Search" by Xuehua Shen et al, Int. Conf. of World Wide Web, 2005; 2 pp.

(Continued)

*Primary Examiner* — Fred I Ehichioya
*Assistant Examiner* — Kris Mackes
(74) *Attorney, Agent, or Firm* — Wells St. John P.S.

(57) ABSTRACT

An information retrieval system and method, and more particularly, a query and document topic category transition analysis system and method in which a query topic category of a query input from a user as an information retrieval keyword and a document topic category of a document which a user regards as relevant and selects from information retrieval results are classified to analyze transition between the query topic category and the document topic category, and a query expansion-based information retrieval system and method using query and document topic category transition analysis in which a query input from a user is expanded using a topic category transition analysis result, and corresponding information or documents are retrieved using the expanded query are provided.

14 Claims, 8 Drawing Sheets

OTHER PUBLICATIONS

"Advertising Keyword Suggestion based on Concept Hierarchy" by Yifan Chen et al, Inf. Conf. of Web Search and Data Mining, 2008); 20 pp.

Andre et al., "From X-Rays to Silly Putty via Uranus: Serendipity and its Role in Web Seaerch", CHI 2009, Apr. 4-9, 2009, 4 pgs, Abstract.

Baeza-Yates et al., "Extracting semantic relations from query logs", In Proc. of SIGKDD'07, pp. 76-85, 2007, Abstract.

Baeza-Yates et al., "The anatomy of a large query graph", J. of Physics A: Mathematical and Theoretical, 2008, Abstract.

Baeza-Yates et al., "The Intention Behind Web Queries", In Proc. of SPIRE'06, pp. 98-109, 2006. Abstract.

Broder et al., "A semantic approach to contextual advertising", In Proc. of ACM SIGIR'07, pp. 559-566, 2007, Abstract.

Broder, "A taxonomy of web serach", ACM SIGIR Forum vol (36), Isswue (2), pp. 3-10, 2002, Abstract.

Chen et al., "Advertising keyword suggestion based on concept hierarchy", In Proc. of ACM WSDM'08, pp. 251-260, 2008, Abstract.

Cho et al., "Impact of Search Engines on Page Popularity" WWW2004, May 17-22, 2004, 10 pgs.

Craswell et al., "Random Walks on teh Click Graph", In Proc. of ACM SIGIR'07, pp. 239-246, 2007.

Cui et al., "Probabilistic query expansion using query logs", In Proc. of WWW'02, pp. 325-332, 2002, Abstract.

Fang et al., "An exploration of axiomatic approaches to information retrieval", In Proc. of ACM SIGIR'05, pp. 480-487, 2005, Abstract.

Fonseca et al., "Concept-based interactive query expansion", In Proc. of CIKM'05, pp. 696-703, 2005, Abstract.

Kawamae et al., "Query and Content Suggestion Based on Latent Interest and Topic Class", WWW 2004, May 17-22, 2004, pp. 350-351, Abstract.

Li et al., "Learning query intent from regularized click graphs", In Proc. of ACM SIGIR'08, pp. 339-346, 2008, Abstract.

Ma et al., "Learning latent semantic relations from clickthrough data for query suggestion", In Proc. of ACM CIKM'08, pp. 709-718, 2008, Abstract.

Nettleton, et al., "Analysis of Web Search Engine Query Session and Clicked Documents", In Proc. of WebKDD'06, pp. 207-226, Abstract, 2007.

Parikh et al., "Inferring semantic query relations from collective user behavior", In Proc. of CIKM'08, pp. 349-358, 2008, Abstract.

Robust classification of rare queries using web knowledge, ACM Portal, 2007, pp. 231-238, Abstract.

Schonhofen, "Identifying Document Topics Using the Wikipedia Category Network", ACM Portal, IEEE Computer Society, 2006, pp. 456-462, Abstract.

Sebastiani, "Machine learning in automated text categorization", ACM Computing Survey, 34(1):1-47, 2002, Abstract.

Shen et al., "Analysis of Topic Dynamics in Web Search", In Proc. of WWW'05, pp. 1102-1103, 2005.

Shen et al., "Building bridges for web query classification", In Proc. of ACM SIGIR'06, pp. 131-138, 2006, Abstract.

Xing et al., "Deep classifier: Automatically Categorizing Search Results into Large-Scale Hierarchies", In Proc. of ACM WSDM'08, pp. 139-148, 2008, Abstract.

Xue et al., "Deep Classificaiton in Large-scale Text Hierarchies", In Proc. of ACM SIRIR'08, pp. 619-626, Jul. 20-24, 2008.

Zhang et al., "Query Expansion Based on Topics", In Proc. of FSDK'08, pp. 610-614, 2008, Abstract.

Zobel, "How reliable are the results of large-scale information retrieval experiments?" In Proc. of ACM SIGIR'98, pp. 307-314, 1998, Abstract.

* cited by examiner

|  | MAP | P@5 | P@10 |
|---|---|---|---|
| [ERF][TREC][4docs][50] | 0.1656 | 0.4694 | 0.4082 |
| - Basis of Perf. Improvement | - | - | - |
| [PRF][TREC][5docs][20] | 0.1718 | 0.3959 | 0.3592 |
| - Max Map | (+4%) | (-16%) | (-12%) |
| [PRF][TREC][3docs][20] | 0.1656 | 0.4245 | 0.3735 |
| - Max P@n | (+0%) | (-10%) | (-9%) |
| [TRF][TREC][QC1][10] | 0.1085 | 0.3592 | 0.2898 |
| - Max Map | (-34%) | (-23%) | (-29%) |
| [TRF][TREC][QC1][20] | 0.1081 | 0.3755 | 0.3020 |
| - Max P@n | (-35%) | (-23%) | (-29%) |
| [TTRF][TREC][4DCs][100] | 0.2185 | 0.5510 | 0.4898 |
| - Max Map | (+32%) | (+17%) | (+20%) |
| [TTRF][TREC][4DCs][500] | 0.2119 | 0.6939 | 0.5837 |
| - Max P@n | (+28%) | (+48%) | (+43%) |

QUERY AND DOCUMENT TOPIC CATEGORY TRANSITION ANALYSIS SYSTEM AND METHOD AND QUERY EXPANSION-BASED INFORMATION RETRIEVAL SYSTEM AND METHOD

CROSS REFERENCE TO RELATED APPLICATION

This application relates to and claims priority to corresponding Korean Patent Application No. 10-2009-0025759, which was filed on Mar. 26, 2009, the entire disclosure of which is incorporated herein by reference.

BACKGROUND

1. Field of the Invention

The present invention relates to an information retrieval system and method, and more particularly, to a query and document topic category transition analysis system and method in which a query topic category of a query input from a user in the form of a set of keywords and a document topic category of a document which a user regards as relevant and selects from information retrieval results are classified to analyze transition between the query topic category and the document topic category, and a query expansion-based information retrieval system and method using query and document topic category transition analysis in which a query input from a user is expanded using a topic category transition analysis result, and corresponding information or documents are retrieved using the expanded query.

2. Discussion of Related Art

Conventional techniques for online (Internet) information retrieval services include a document similarity ranking technique for a search engine, a topic category-based document classification technique, and a topic category-based log analysis technique.

A Document Similarity Ranking Technique for a Search Engine (Hereinafter, "Conventional Art 1")

In conventional art 1, documents relevant to a query input from a user are retrieved based on a similarity between the document and the query. Most of information retrieval web portal sites which are commercialized (in service) rank various kinds of web contents such as blogs, knowledge, images, news, and shopping information based on retrieval queries through a search engine and provide users with ranked retrieval results.

To this end, all documents on the web have to be indexed in advance, and a search engine statistically analyzes terms of documents and links between documents using document indexes, generates retrieval results suitable for a query input by a user in the form of a ranked list (a set of links indicating documents) and provides the user with the retrieval results through a web page.

However, in information retrieval ranking, usually texts and metadata of documents and relation information (for example, links or topic categories) between documents are used. A method which gives attracting contents from public as high rank is restrictedly used, but there is a problem in that a user preference which depends on a query category of information retrieval keywords entered by a user is excluded from factors for determining information retrieval ranking.

Topic Category-Based Document Classification Technique (Hereinafter, "Conventional Art 2")

In conventional art 2, in constructing an information retrieval system, a document is classified in advance into one topic category which is previously defined or multiple topic categories which are previously defined.

For example, a document classification process of conventional art 2 is described below.

A process of representing documents in a form suitable for machine learning is performed, and, during the document representing process, selecting appropriate features, and weighting the features are preceded.

Then, in order to accurately allocate a category within an appropriate time, a process of learning a document categorization rule is performed, newly inputted documents are classified according to the learning result.

In particular, in the case in which text-based taxonomy which is already constructed is equipped, a method of extracting input vectors from input documents, generating similarity to vectors representing topic categories which are previously defined, and allocating topic categories to the documents is used.

The document classification process described above may be variously applied to fields such as a voice recognition-based customer center automatic call classification system, a topic category classification system of advertisement contents for keyword advertisements, and an automatic classification system of web sites/patents/academic literature/books.

Meanwhile, a method of automatically identifying a topic category of a user query or a topic category of a document using taxonomy which continuously evolves such as an open directory project (hereinafter, "ODP") has been attempted, but no research on analyzing transition between a query topic category and a category of relevant documents has been conducted.

Topic Category-Based Log Analysis Technique (Hereinafter, "Conventional Art 3")

In conventional art 3, based on session information included in a web log related to a query input from a user, session information included in a web log related to retrieval results for the query, and a topic category of a user input query and a user read content, a user navigation path is detected, and navigation path transition is analyzed and used in an information retrieval system.

For example, in *"Analysis of Topic Dynamics in Web Search" by Xuehua Shen et al, Int. Conf. of World Wide Web,* 2005, an experiment for analyzing and learning topic category transition between web pages which a user queries and then visits according to time and a user (personal/group/general public) based on a Markov model and anticipating a web page which a user will visit later has been conducted. An aspect of user behavior could be somewhat anticipated through an experimental result, and when users were classified into groups of persons with similar behavior and analyzed, it turned out that performance was improved.

However, the conventional art described above anticipates a topic category of a web page which a user will visit without considering a difference between a query input from a user and a web page visited by users.

Also, the conventional art described above uses the ODP taxonomy, but has a problem in that it uses only a small number (15) of highest level (coarse-grained) topic categories as topic categories and cannot perform precise (fine-grained) topic category classification based on the ODP taxonomy.

For the foregoing reasons, there is an urgent need for technology which can more precisely analyze transition of a topic interesting to a user who uses an information retrieval service and classify the user's intention or interesting topic into more detailed query and document topic categories in view of a phenomenon (a propensity or a tendency) in which a topic interesting to a user when an information retrieval keyword is input is different from a topic interesting to the user when the user selects a document which the user regards as relevant from information retrieval results.

There is also an urgent need for technology which can analyze topic category transition between a user query and a relevant document (a document selected by a user) more precisely based on a query and document topic category classification.

There is also an urgent need for technology which automatically extracts a topic transition tendency and expands a user query based on query and document topic category transition analysis and a user log and thus provides information retrieval results with high user satisfaction.

There is also an urgent need for technology which can detect a topic category of a document (content) which is attracting public attention or which a user prefers according to a topic and give documents corresponding to the topic category high rankings among retrieval results.

SUMMARY OF THE INVENTION

The present invention is directed to a query and document topic category transition analysis system and method in which a query topic category of a query input by a user as an information retrieval keyword and a document topic category of a document which a user regards as relevant and selects from information retrieval results are linked to analyze transition between the query topic category and the document topic category, and a query expansion-based information retrieval system and method using query and document topic category transition analysis in which a query input from a user is expanded using a topic category transition analysis result, and an expanded query is used to retrieve information or documents.

According to an aspect of the present invention, there is a method of analyzing transition between a query topic category and a document topic category, including: classifying a query input from a user and classifying a document which a user selects from information retrieval results for the input query; deriving a weight with respect to topic category transition between the query topic category and the document topic category; and generating a topic category transition map as a result of analyzing topic category transition between a user query and a relevant document based on the derived weight for the topic category transition.

The method may further include: generating corresponding documents as pseudo documents according to each topic category for the user query and the relevant document based on the generated topic category transition map; and extracting at least one representative keyword from the generated pseudo documents and storing the at least one representative keyword.

According to another aspect of the present invention, there is a query expansion-based information retrieval method using query and document topic category transition analysis, including: in a state in which a topic category transition map is generated as a result of analyzing topic category transition between a user query and a relevant document, and corresponding documents are generated as pseudo documents according to each topic category for the user query and the relevant document, classifying a corresponding query topic category based on query and document text information for an input query input from a user; allocating a relevant document topic category for the classified query topic category based on the topic category transition map; ranking representative keywords for the query topic category and the relevant document topic category based on the pseudo documents; expanding the input query using the ranked representative keywords; and retrieving corresponding documents using the expanded query.

The method may further include providing a user with the retrieved documents according to a ranking of the representative keywords.

According to still another aspect of the present invention, there is a computer readable record medium recording a program of implementing the method of one aspect of the present invention or another aspect of the present invention.

According to yet another aspect of the present invention, there is a system for analyzing transition between a query topic category and a document topic category, including: a relevance determined document collection database which stores query and document text information; a topic category classifier which classifies a query topic category for a user query based on the query and document text information and classifies a document topic category for a document selected from information retrieval results for the user query based on the query and document text information; and a topic category transition map database which stores a topic category transition map between a user query and a relevant document which is generated based on a weight for topic category transition between the query topic category and the document topic category classified by the topic category classifier.

The system may further include a topic category-classified pseudo document set database in which corresponding documents are generated as pseudo documents according to each topic category for a user query and a relevant document based on the topic category transition map, and at least one representative keyword extracted from the pseudo documents is stored.

According to yet another aspect of the present invention, there is a query expansion-based information retrieval system using query and document topic category transition analysis, including: a topic category transition analysis system which stores a topic category transition map generated as a result of analyzing topic category transition between a user query and a relevant document and corresponding documents generated as pseudo documents according to each topic category for the user query and the relevant document; a query expander which expands a user query, allocates a relevant document for the classified document topic category, and ranks representative keywords for the relevant document topic category based on the pseudo documents, and expands the user query using the ranked representative keywords; and a search engine which retrieves corresponding documents using the user query expanded by the query expander.

BRIEF DESCRIPTION OF THE DRAWINGS

The above and other purposes, characteristics and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
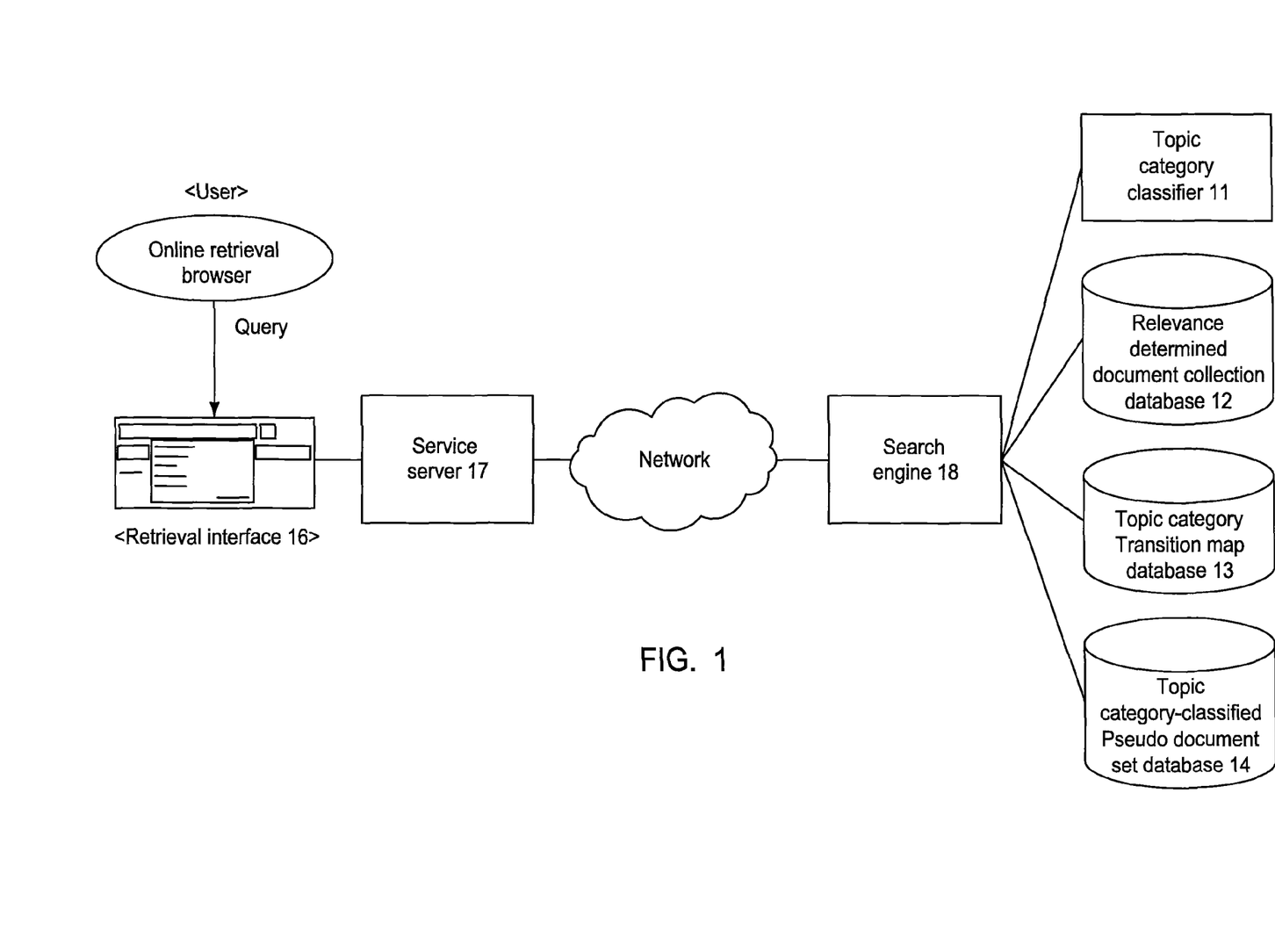
FIG. 1 illustrates the configuration of a query expansion-based information retrieval system using query and document topic category transition analysis according to an exemplary embodiment of the present invention.
Figure 2:
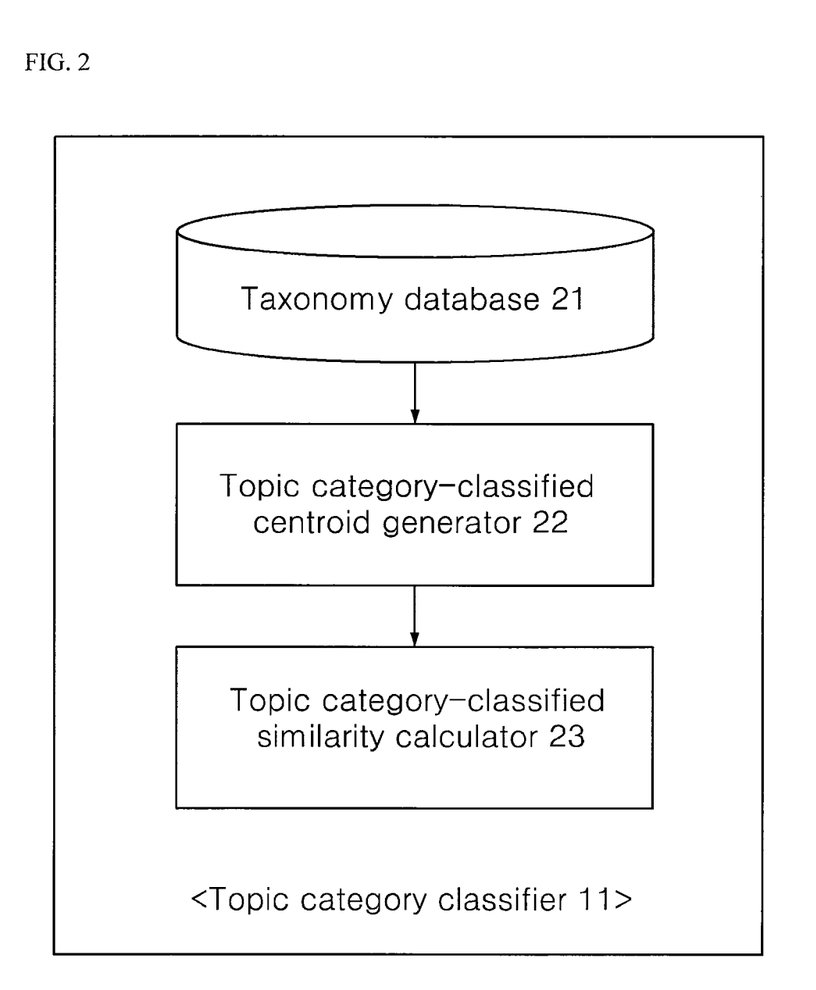
FIG. 2 is a block diagram of a topic category classifier according to an exemplary embodiment of the present invention.
Figure 3:
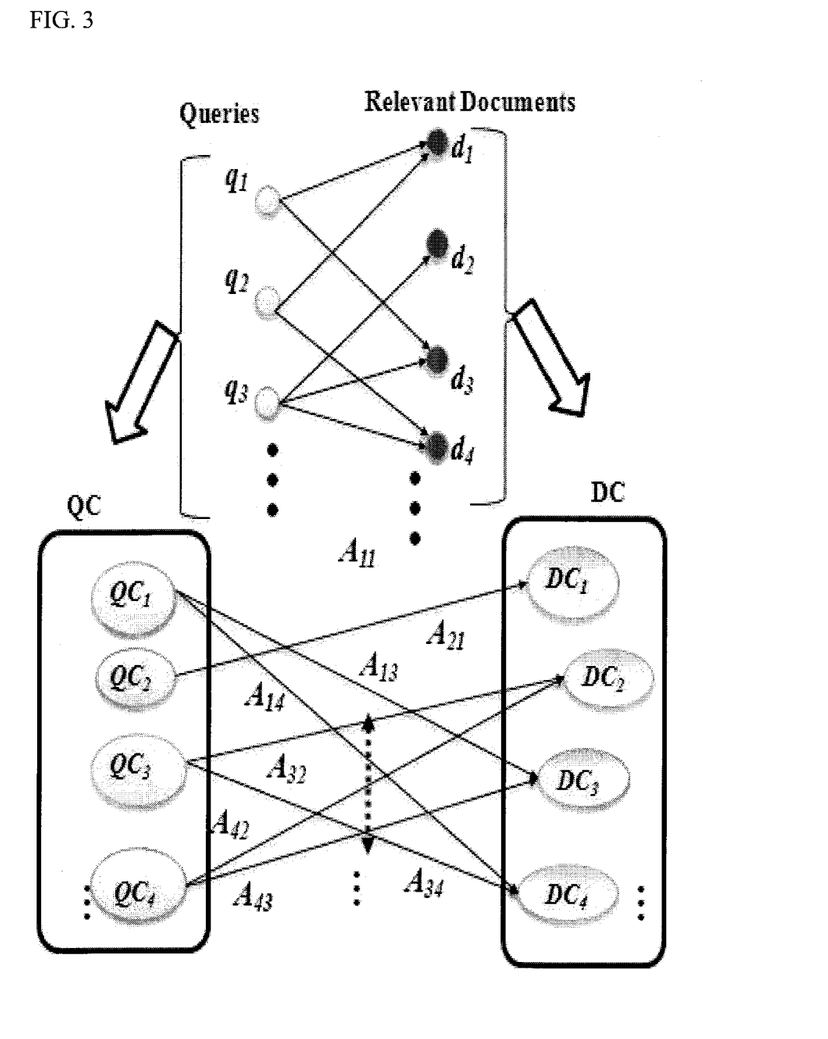
FIG. 3 is a schematic diagram illustrating a topic category transition map according to an exemplary embodiment of the present invention.
Figure 4:
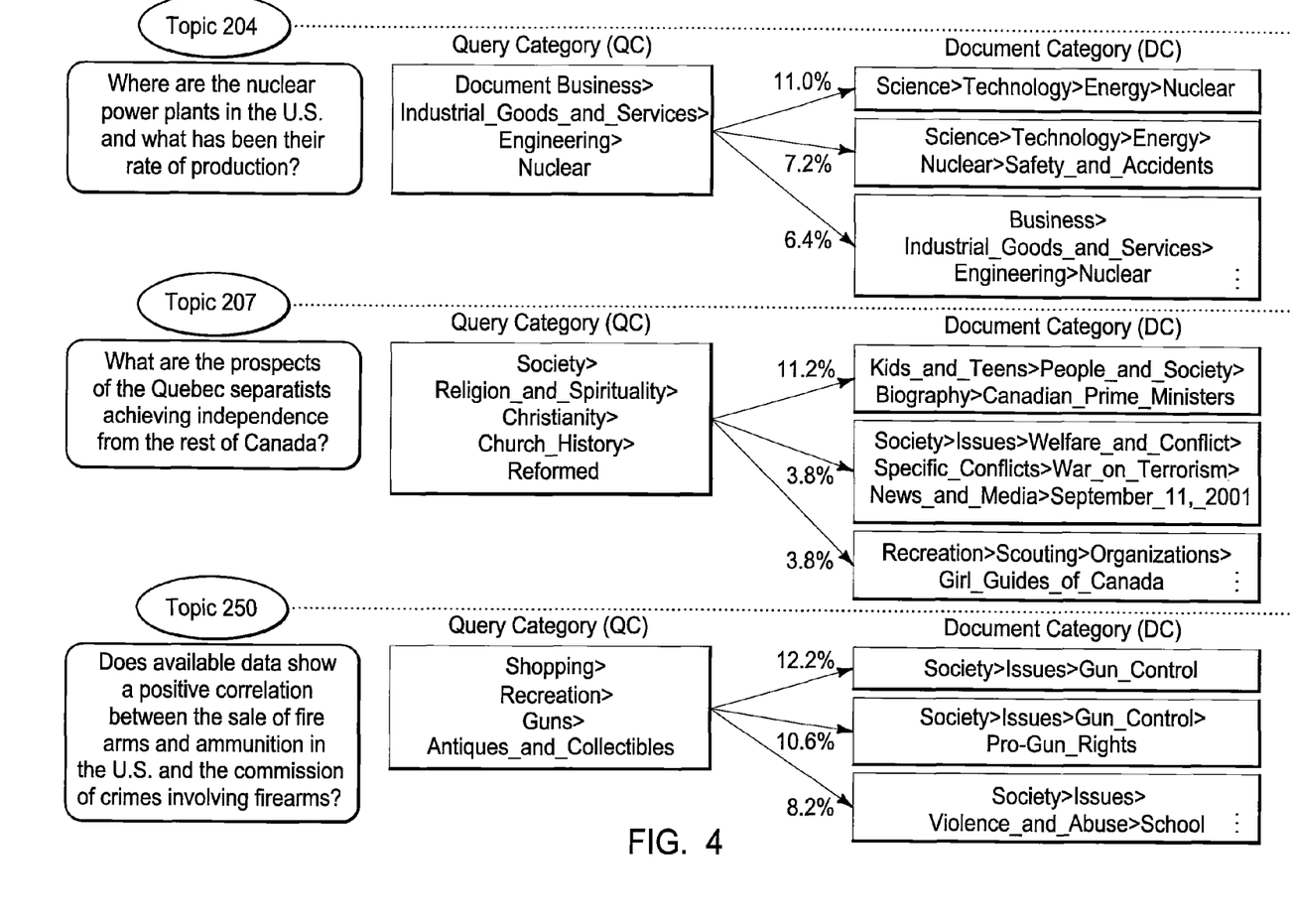
FIG. 4 is a diagram for describing a result of analyzing topic category transition between a user query and a relevant document according to an exemplary embodiment of the present invention.
Figure 5:
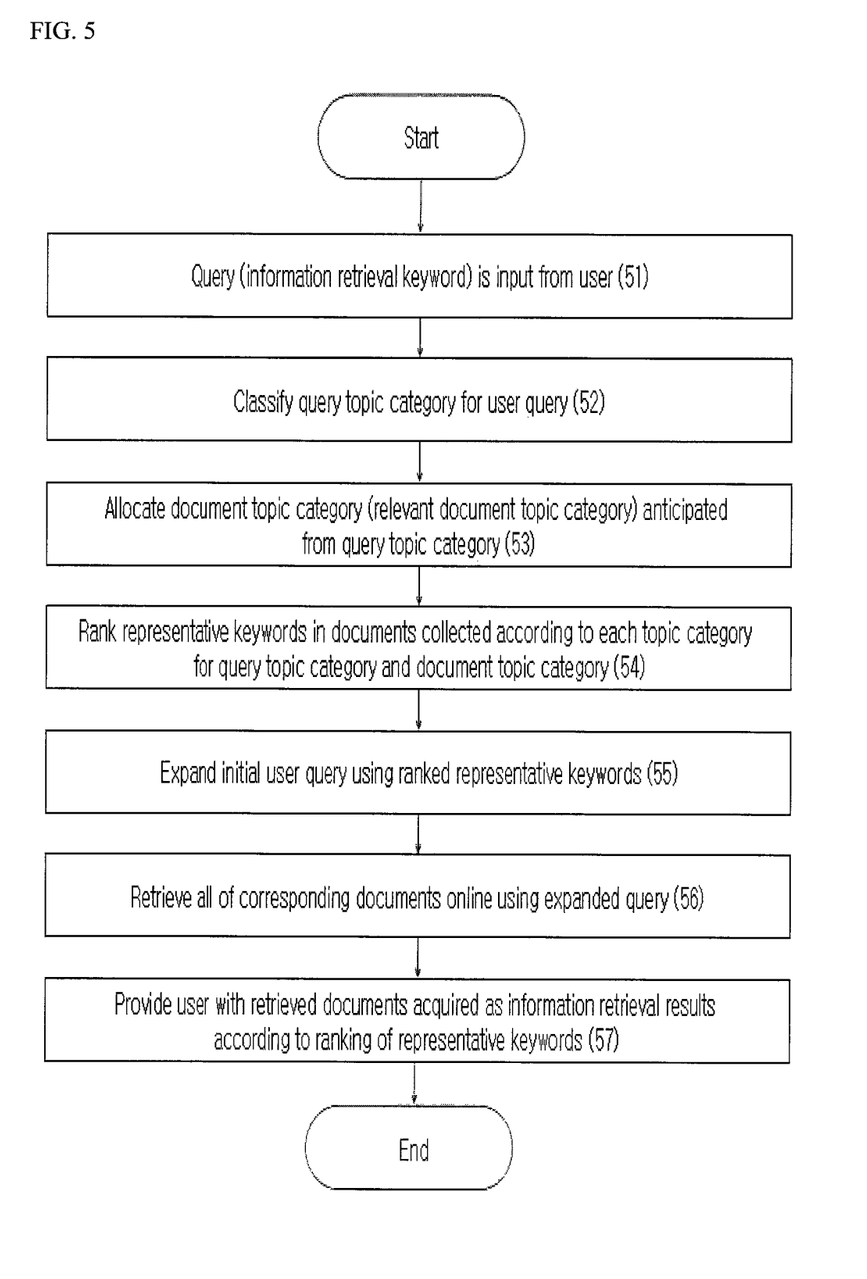
FIG. 5 is a flowchart illustrating a query expansion-based information retrieval method using query and document topic category transition analysis according to an exemplary embodiment of the present invention.

FIG. 1 illustrates the configuration of a query expansion-based information retrieval system using query and document topic category transition analysis according to an exemplary embodiment of the present invention, FIG. 2 is a block diagram of a topic category classifier according to an exemplary embodiment of the present invention, FIG. 3 is a schematic diagram illustrating a topic category transition map according to an exemplary embodiment of the present invention, FIG. 4 is a diagram for describing a result of analyzing topic category transition between a user query and a relevant document according to an exemplary embodiment of the present invention, and FIG. 5 is a flowchart illustrating a query expansion-based information retrieval method using query and document topic category transition analysis according to an exemplary embodiment of the present invention.

In order to help understand the present invention, a query expansion-based information retrieval system and method using query and document topic category transition analysis (hereinafter, "information retrieval system and method") will be first described, and a query and document topic category transition analysis system and method (hereinafter, "topic category transition analysis system and method") will be described in corresponding portions while describing the information retrieval system and method.

Meanwhile, in an exemplary embodiment of the present invention, a document represents a web page, but documents such as general news and blogs which include contents and metadata may be included as documents. Contents may include a text, a voice, and a moving picture, and metadata may include a document language, a document title, a document size, a document identifier (for example, URL information), a document format, a topic category, and other various attributes. For example, according to an exemplary embodiment of the present invention, a document is preferably interpreted as one which includes any format of data which represents (includes) information on the web (Internet).

Also, according to an exemplary embodiment of the present invention, a query means an information retrieval keyword input from a user, and a relevant document means a document (for example, a document which is high in relevance to user interest transition) which a user regards as relevant and selects from information retrieval results.

Also, according to an exemplary embodiment of the present invention, a query log includes a user query log of a certain domain as well as a web query log in a web information retrieval service and is not limited to a certain retrieval service filed.

Query Expansion-Based Information Retrieval System Using Query and Document Topic Category Transition Analysis.

As shown in FIG. 1, an information retrieval system according to an exemplary embodiment of the present invention includes a topic category classifier 11, a relevance determined document collection database 12 (also called a test collection database), a topic category transition map database 13, and a topic category-classified pseudo document set database 14.

The information retrieval system according to an exemplary embodiment of the present invention further includes a retrieval interface 16, a service server 17, and a search engine 18 which are required to realize a typical information retrieval service. For example, the information retrieval system includes a retrieval interface for receiving a query (information retrieval keyword) from a user through an online retrieval browser and a service server for ranking relevant documents (including contents) as retrieval results which a search engine retrieves in response to a user query and provides a user with ranked documents through an online web browser.

The components of the information retrieval system according to an exemplary embodiment of the present invention will be described in detail. First, the topic category classifier 11 classifies a query (hereinafter, "user query") input from a user as an information retrieval keyword according to a query topic category (QC). The topic category classifier 11 classifies a document which a user regards as relevant and selects from information retrieval results according to a document topic category (DC).

The relevance determined document collection database 12 stores query and document text information for determining a document (a document which is high in relevance to user interest transition, that is, a relevant document) relevant to a user query. The relevance determined document collection database 12 is also called a test collection database, and a test collection commonly includes a query collection, a news document collection, and mapping information between documents which are relevant or not relevant to a query.

The topic category transition map database 13 stores a topic category transition map which is a result of analyzing topic category transition between a user query and a relevant document through a query and document topic category transition analysis technique according to an exemplary embodiment of the present invention.

The topic category-classified pseudo document set database 14 stores a set of pseudo documents classified according to a topic category, which will be used in expanding a query input from a user using a topic category transition analysis result.

Query and Document Topic Category Transition Analysis Technique.

In an exemplary embodiment of the present invention, a user query and a relevant document are classified as one or more topic categories extracted from among topic categories which are previously defined (that is, one or more topic categories are imparted to a user query and a relevant document), a relevance score for a query topic category of a user query is determined, a relevance score for a document topic category of a relevant document is determined, and transition between a query topic category and a document topic category is analyzed based on a weight between a query topic category and a document topic category.

A process of analyzing transition between a query topic category and a document topic category is preferably performed by the topic category classifier 11 after query topic category classification and document topic category classification are performed. A query topic category classification process and a document topic category classification process will be described later in detail with reference to FIG. 2.

That is, the topic category classifier 11 inquires into query and document text information stored in the relevance determined document collection database 12 through a query input from a user, and extracts a corresponding query topic category and classifies a user query as the extracted query topic category (that is, the extracted query topic category is imparted to a user query).

The topic category classifier 11 also inquires into query and document text information stored in the relevance determined document collection database 12 through a document which a user regards as relevant and selects from information retrieval results, and extracts a corresponding document topic category and classifies a relevant document as the extracted document topic category (that is, the extracted document topic category is imparted to a relevant document).

Then, the topic category classifier 11 determines a category name and a relevance score of the query topic category and a category name and a relevance score of the document topic category, determines a weight between a query topic category and a document topic category based on the relevance scores, and generates (acquires) a topic category transition map (the topic category transition map database 13). A process of determining a weight between a query topic category and a document topic category uses Formula 1:

$$w_{xy} = S(x,q_j) + S(y,d_j)$$ Formula 1 where "$w_{xy}$" denotes a weight between a query topic category x of a user query $q_j$ and a document topic category of a relevant document $d_j$. A function $S(\cdot)$ denotes a relevance score provided (loaded) by the topic category classifier 11.

For example, as input of a pair of (query, document) increases, a degree of topic category transition from a certain query topic category to a certain document topic category is expressed as an increment in a weight $w_{xy}$ through Formula 1.

As described above, a weight between a query topic category and a document topic category is derived based on an information retrieval log (a log related to a query input from a user and a log related to a relevant document which a user selects from information retrieval results) and data (query and document text information) of the relevance determined document collection database 12.

According to an exemplary embodiment of the present invention, a weight between a query topic category and a document topic category which is derived as described above is converted into a transition probability value that a certain query topic category will transition to a certain document topic category or a transition probability value that a certain query will transition to a certain document topic category using Formulas 2 and 3 described below.

That is, according to an exemplary embodiment of the present invention, transition between a query topic category and a document topic category is analyzed in view of both a case in which a certain query exists and a case in which a certain query does not exist in the topic category transition map database 13.

FIG. 3 illustrates a topic category transition map derived through computation of a transition probability value that a certain query topic category $QC_j$ will transition to a certain document topic category $DC_k$. FIG. 3 illustrates an example which uses a transition probability value that a certain query category will transition to a certain document topic category, but it will be apparent to those skilled in the art that the present invention covers a case in which a transition probability value that a certain query will transition to a certain document topic category is used.

According to an exemplary embodiment of the present invention, a transition probability value in which a certain query topic category $QC_j$ will transition to a certain document topic category $DC_k$ is computed by dividing a transition weight from a current query topic category to a certain document topic category by all transition weights derived from a current query topic category as in Formula 2:

$$P(dc_k \mid qc_j) = \frac{A_{jk}}{\sum_i A_{ji}}$$ Formula 2 where $A_{jk}$ which represents a weight of a transition occurrence from a query topic category $QC_j$ to a document topic category $DC_k$ is obtained by adding all of weights (weights between a query topic category and a document topic category) which can be obtained between a query and a document which belong to a query topic category $QC_j$ and a document topic category $DC_k$, respectively.

Meanwhile, a transition probability value that a certain query Q will transition to a certain document topic category $DC_k$ is computed by adding all of probability values that each of n query topic categories $QC_j$ as which a query Q can be classified will transition to a certain document topic category $DC_k$, that is, a sum of probability values each of which is computed by Formula 2 for each query topic category $QC_j$, as in Formula 3:

$$P(dc_k \mid q) = \sum^n \left( \frac{A_{jk}}{\sum_i A_{ji}} \right).$$ Formula 3

FIG. 4 illustrates a result of analyzing topic category transition between a user query and a relevant document based on a topic category transition map derived through computation of a transition probability value that a query topic category $QC_j$ will transition to a document topic category $DC_k$.

For example, in an exemplary embodiment of the present invention, a "TREC4 ad hoc search test collection" is used as an example of the relevance determined document collection database 12, and FIG. 4 illustrates a representative example of a topic category transition map in which the TREC4 ad hoc search test collection is utilized.

The TREC4 ad hoc search test collection is a test collection for evaluating a search engine, which was developed by National Institute of Standards and Technology (NIST), and includes a query collection, a news document collection, and mapping information between documents which are relevant or not relevant to a query. Data used in an exemplary embodiment of the present invention is TREC4 data which includes, for example, 49 queries (average 7.5 words) of an interrogative sentence type and news documents such as AP news and Wall Street Journal from 1988 to 1992 which is commonly known as "Tipster disk 2&3", wherein the total number of news documents is 567,529, and each query has an average of 133 related news documents.

As shown in FIG. 4, among three query topics Topic 204, Topic 207 and Topic 250, only Topic 204 has three document topic categories DC which are highest in probability that a query topic category QC will transition. In the case of Topic 204, three document topic categories are topic categories which are determined as relevant to a topic for a user query. That is, three document topic categories of Topic 204 are topic categories for a relevant document.

In the case of Topic 207, a query topic category was wrongly allocated, and a second document topic category was also wrongly allocated.

In the case of Topic 250, a query topic category was somewhat wrongly allocated, but document topic categories are determined as properly allocated.

For example, in an exemplary embodiment of the present invention, a case in which the number of times that one query topic category transitions to a certain document topic category is small is treated as noise, and a case in which the number of transition times is large is focused, whereby an information retrieval service in which a main tendency of the general public or a certain group is reflected is provided.

According to an exemplary embodiment of the present invention, as can be seen from FIG. 4, a topic category of each of a user query and a relevant document is hierarchically classified, and a result of analyzing topic category transition between a user query and a relevant document is derived based on a topic category classification result.

Corresponding documents are generated as pseudo documents according to a topic category of each of a user query and a relevant document based on a result of analyzing topic category transition between a user query and a relevant document, which is performed by the topic category classifier 11 as described above, and pseudo documents are stored in the topic category-classified pseudo document set database 14.

For example, a pseudo document set classified according to a topic category is configured using a method of ranking representative keywords in documents collected according to each topic category, for example, a DF-ICF method (which is disclosed in "*Advertising Keyword Suggestion based on Concept Hierarchy*" by Yifan Chen et al, Inf. Conf. of Web Search and Data Mining, 2008), and the representative keywords are used in expanding a query input from a user to perform information retrieval (query expansion will be described later with reference to FIG. 5).

Next, a query topic category classification process and a document topic category classification process which are mentioned above will be described in detail with reference to FIG. 2.

Topic Category Classification Technique

As described in FIG. 1, the query and document topic category transition analysis system according to an exemplary embodiment of the present invention includes the topic category classifier 11, the relevance determined document collection database (also called the test collection database) 12, the topic category transition map database 13, and the topic category-classified pseudo document set database 14, and a query topic category classification process and a document topic category classification process will be described below in detail focusing on operation of the topic category classifier 11.

As shown in FIG. 2, the topic category classifier 11 includes a taxonomy database 21, a topic category-classified centroid generator 22, and a topic category-classified similarity calculator 23.

The taxonomy database 21 may be a certain taxonomy which includes query topic categories and document topic categories which are suitable for an information retrieval service field, for example, to which the present invention is applied, certain information for expressing each query topic category, and certain information for expressing each document topic category.

According to an exemplary embodiment of the present invention, the ODP (also known as Directory Mozilla (DMOZ)) which is a web site taxonomy massively constructed by the general public is used as an example of the taxonomy database 21 in order to capture all general interests of users.

That is, according to an exemplary embodiment of the present invention, fine-grained topic category classification for a user query and a relevant document is performed through the topic category classifier using an external taxonomy such as the ODP, and transition between a query topic category and a document topic category is configured as a topic category transition map based on the fine-grained topic category classification. In particular, according to an exemplary embodiment of the present invention, a topic category for each of a user query and a relevant document is hierarchically classified by the topic category classifier 11, which will be described later.

A process of analyzing topic category transition between a user query and a relevant document is summarized below in order to help understand the present invention.

According to an exemplary embodiment of the present invention, fine-grained topic category classification for each of a user query and a relevant document is performed using an external taxonomy such as the ODP.

Then, a transition probability value for topic category transition between a query topic category and a document topic category is computed based on the fine-grained topic category classification to generate a topic category transition map as a result of analyzing topic category transition between a user query and a relevant document.

Based on the result of analyzing topic category transition between a user query and a relevant document, corresponding documents are collected according to a topic category of each of a pair of (a user query, a relevant document) to generate pseudo documents, and representative keywords are extracted from the pseudo documents and stored in the topic category-classified pseudo document set database 14.

The topic category-classified centroid generator 22 generates a centroid vector using certain information for expressing each topic category according to each topic category (a query topic category and a document topic category) stored in the taxonomy database 21 as in Formula 4. For example, according to an exemplary embodiment of the present invention, a snippet web site address, a title and a description which belong to each topic category of the ODP are used as certain information for expressing each topic category.

$$\vec{c_j} = \frac{1}{|c_j|} \sum_{\vec{s} \in c_j} \frac{\vec{s}}{\|\vec{s}\|}$$ Formula 4 where $\vec{c_j}$ is the centroid for category $c_j$; s iterates over the snippets in a particular category. For example, as in Formula 4, according to an exemplary embodiment of the present invention, snippet web documents s belonging to a topic category $c_j$ are collectively used, so that a centroid vector is generated using words belonging to the snippet web documents.

The topic category-classified similarity calculator 23 computes cosine similarity according to a query topic category for a query input to the topic category classifier and cosine similarity according to a document topic category for a document input to the topic category classifier, based on a centroid vector generated by the topic category-classified centroid generator 22.

The topic category classifier 11 classifies a query topic category for an input query and a document topic category for an input document based on cosine similarity according to a query topic category computed for an input query and cosine similarity according to a document topic category computed for an input document.

Next, a query expansion-based information retrieval method according to an exemplary embodiment of the present invention will be described with reference to FIG. 5. A query expansion-based information retrieval process which will be described below with reference to FIG. 5 is performed by an information retrieval system, preferably, the search engine 18. Here, a search engine is preferably interpreted as a main body for performing information retrieval rather than a module realized by a certain process or device.

Query Expansion-Based Information Retrieval Technique Using Query and Document Topic Category Transition Analysis First, when a query (that is, an information retrieval keyword) is input to the search engine 18 from a user through an online retrieval browser (that is, the retrieval interface 16) (Operation 51), the search engine 18 instructs the topic category classifier 11, so that the topic classifier 11 inquires into the relevance determined document collection database 12 and classifies a query topic category for a user query (Operation 52).

Then, the search engine 18 instructs the topic category classifier 11, so that the topic category classifier 11 inquires into the topic category transition map database 13 and allocates a document topic category (that is, a relevant document topic category of a document which a user regards as relevant and so selects) anticipated from the classified query topic category (Operation 53). Here, in the topic category transition map database 13, a result of analyzing topic category transition between a user query and a relevant document described above is included in a topic category transition map.

Subsequently, the search engine 18 instructs the topic category classifier 11, so that the topic category classifier 11 inquires into the topic category-classified pseudo document set database 14 and ranks representative keywords in documents collected according to each topic category for each of the allocated query topic category and the allocated document topic category, for example, ranks keywords acquired after rearranging using a DF-ICF method (Operation 54). For example, according to an exemplary embodiment of the present invention, keywords are extracted from documents corresponding to a topic category which is allocated to relevant documents, and are ranked based on a DF*ICF weight to thereby configure a representative keyword list. Also, according to an exemplary embodiment of the present invention, a second highest relevant document topic category and a third highest relevant document topic category as well as a highest relevant document topic category may be included for the allocated query topic category, and a representative keyword list may be configured by ranking keywords thereof.

Then, the search engine 18 instructs the topic category classifier 11, preferably a query expander (not shown) installed at a search engine 18 side, so that the query expander expands a user query (that is, a query input from a user in Operation 51), which is initially input, by using the ranked representative keywords (Operation 55). The expanded query is configured by synthesizing an initial user query and the ranked representative keywords, and a process of expanding a query may be performed through simple merging or a synthesis method (Rocchio query expansion method) using a synthesis weight. In particular, according to an exemplary embodiment of the present invention, a transition probability value that a query topic category $QC_j$ will transition to a document topic category $DC_k$, which is computed by Formula 2, may be used as a weight for query expansion.

Then, the search engine 18 retrieves all of corresponding documents on the web (Internet) using the expanded query obtained through the query expander (Operation 56).

Subsequently, the search engine 18 provides a user with retrieved documents at an online retrieval browser side through the service server 17 according to a ranking of the representative keywords (Operation 57). For example, the search engine 18 provides a user with retrieved documents as information retrieval results for a user query in the form of a web page including a list (that is, a set of links indicating documents) which is ordered according to a ranking of the representative keywords through the service server 17.

Next, a performance evaluation result for the query expansion-based information retrieval technique (hereinafter, "the present algorithm") using the query and document topic category transition analysis according to an exemplary embodiment of the present invention will be described with reference to FIGS. 6 to 8.

Figure 6:
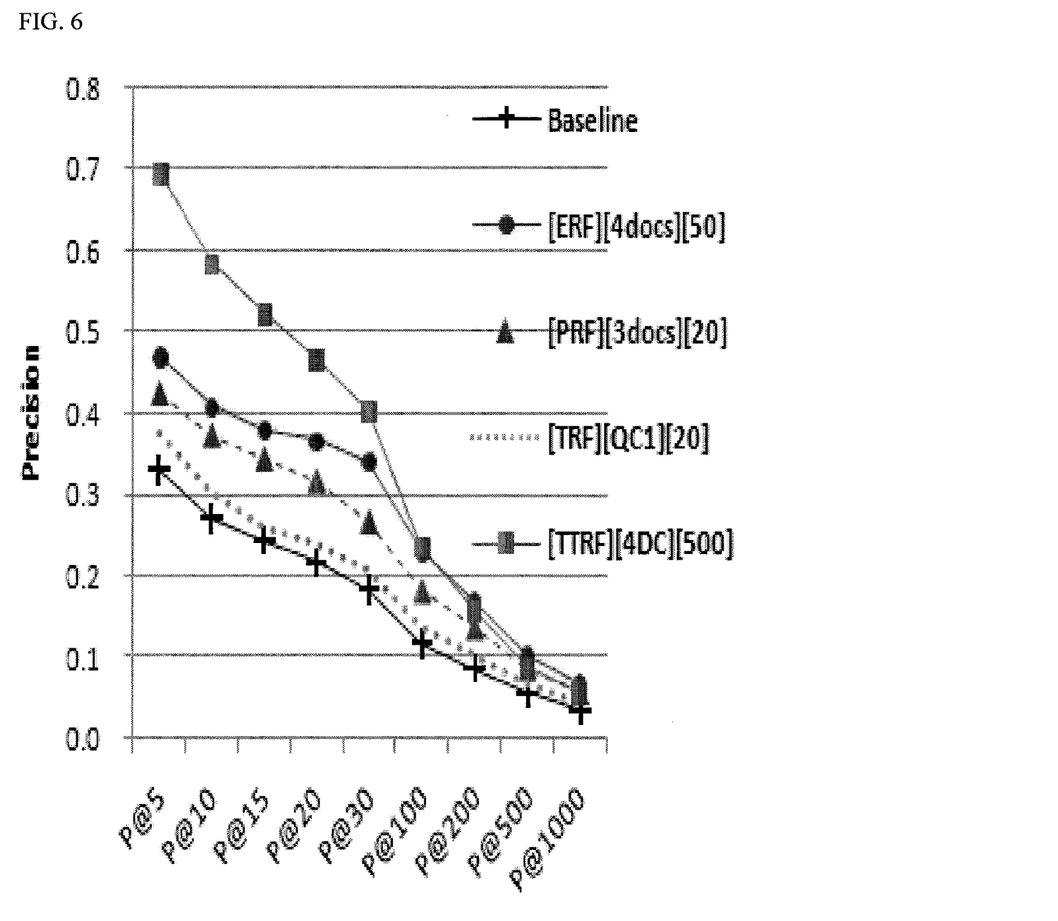
FIGS. 6 to 8 illustrate performance evaluation of a retrieval algorithm according to an exemplary embodiment of the present invention.
Figure 7:
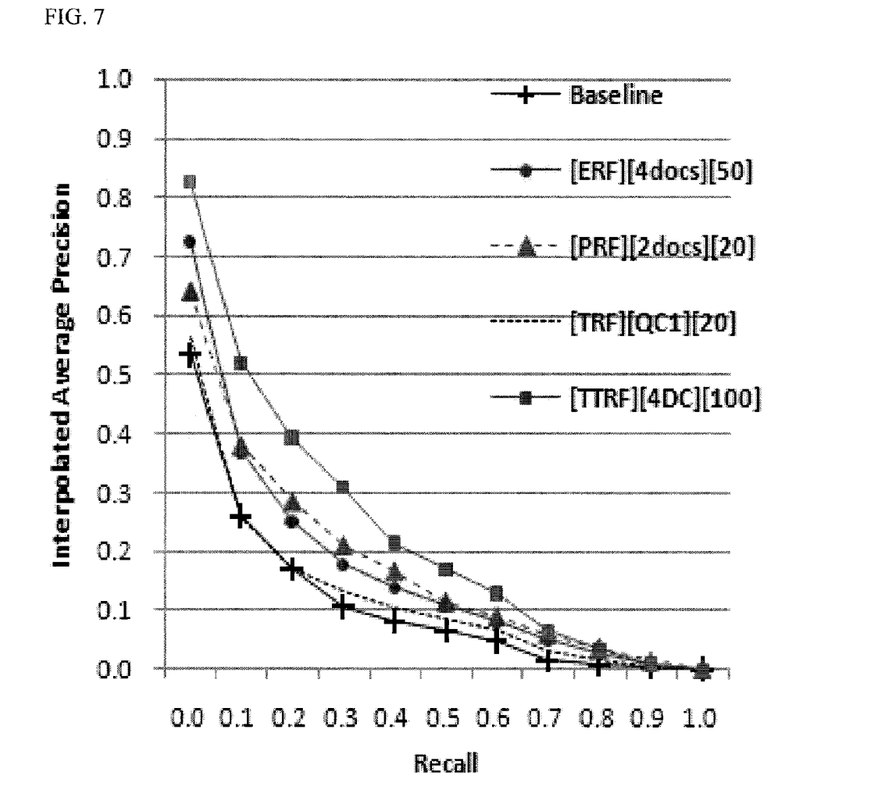
Figure 8:
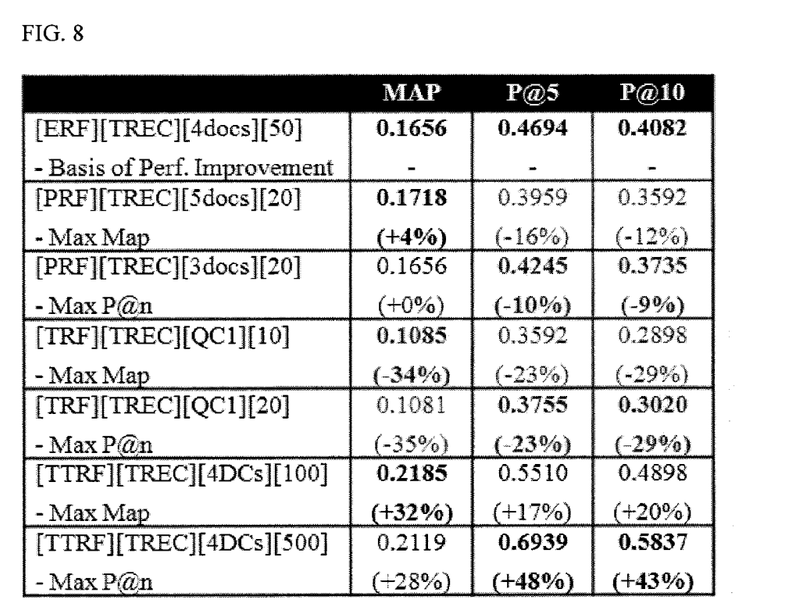

FIGS. 6 to 8 illustrate performance evaluation of a retrieval algorithm according to an exemplary embodiment of the present invention. FIG. 6 illustrates a performance evaluation result for "Precision@n", FIG. 7 illustrates a performance evaluation result for "Interpolated precision-recall", and FIG. 8 illustrates a performance evaluation result for "Overall Performance Comparisons".

In an experiment for comparing performance of an existing information retrieval algorithm and the present algorithm, "TREC4 ad hoc search test collect" was used.

As relevance feedback methods used in the experiment, 1) a method using a basic query (a baseline retrieval method), 2) an explicit relevance feedback (ERF) method, 3) a pseudo relevance feedback (PRF) method, 4) a topic relevance feedback (TRF) method, and 5) a topic transition relevance feedback (TTRF) method were used. Of these, 5) the TTRF method is an algorithm suggested according to an exemplary embodiment of the present invention, and the remaining methods are well-known algorithms.

In the experiment, it was tested how many documents relevant to a query are preferentially retrieved with respect to the respective algorithms mentioned above while changing the number (1 to 5 docs) of documents used in relevance feedback, the number (0 to 500) of keywords used for query expansion, and the number (1 to 5 DC) of document topic categories. Cases which were highest in performance in each of the algorithms are used as representative performance of the algorithms and compared.

A result of evaluating performance of the algorithms is as follows.

"Precision@n" illustrated in FIG. 6 is a criterion for evaluating how preferentially a document relevant to a query is retrieved, and "Interpolated precision-recall" illustrated in FIG. 7 is a criterion for evaluating how many documents relevant to a query are preferentially retrieved.

It can be understood from FIGS. 6 and 7 that the algorithm TTRF suggested according to an exemplary embodiment of the present invention is most excellent in performance. In particular, performance of the algorithm TTRF according to an exemplary embodiment of the present invention when several document topic categories (4DC in the present experiment) are considered is more excellent than when only one document topic category (1DC) is considered.

A performance improvement ratio of the algorithm TTRF according to an exemplary embodiment of the present invention is illustrated in FIG. 8.

In the table of FIG. 8, the ERF method is used as a reference for comparing performance improvement ratios of the algorithms. The algorithm TTRF according to an exemplary embodiment of the present invention showed performance improvement of 28%, 48%, and 43% in three measures of mean average precision (MAP), P@5 (precision at 5 retrieved documents), and P@10 (precision at 10 retrieved documents), respectively.

The query and document topic category transition analysis method and the query expansion-based information retrieval method can be implemented as a computer program. Codes and code segments which configure the computer program can be easily inferred by computer programmers skilled in the art. The computer program is stored in a computer readable record medium (information storing medium), and is read and executed in a computer to implement the functions described above. The computer readable record medium includes all types of record media which can be read by a computer.

As described above, according to exemplary embodiments of the present invention, a document topic category relevant to a query topic category for an information retrieval keyword input from a user is anticipated to expand a user query, so that documents in which user interest is reflected can be retrieved. Documents with high relevance are ranked high, and user satisfaction for a retrieval service is high.

Also, according to exemplary embodiments of the present invention, interest transition of a user is efficiently analyzed using a fine-grained hierarchical topic category structure, and an analysis result can be used for query expansion.

Also, according to exemplary embodiments of the present invention, an information retrieval service in which a main tendency of the general public or a certain group with respect to a certain topic is reflected based on the number of times that a query topic category transitions to a document topic category can be provided.

Furthermore, according to exemplary embodiments of the present invention, when a user query and a document (for example, text contents) relevant to a user query are defined, the present invention can be flexibly applied to various information retrieval service fields.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A method of analyzing transition between a query topic category and a document topic category, comprising:
   determining a query topic category based on query and document text information with respect to a query input from a user and determining a document topic category based on query and document text information with respect to a document which a user selects from information retrieval results for the input query;
   deriving a weight with respect to topic category transition between the classified query topic category and the classified document topic category;
   generating a topic category transition map as a result of analyzing topic category transition between a user query and a relevant document based on the derived weight for the topic category transition;
   generating corresponding documents as pseudo documents according to each topic category for the user query and the relevant document based on the generated topic category transition map; and
   extracting at least one representative keyword from the generated pseudo documents and storing at least one representative keyword.

2. The method of claim 1, wherein in determining the query topic category and determining the document topic category, query and document text information is acquired using at least one external taxonomy, fine-grained hierarchical query topic category classification is performed, and fine-grained hierarchical document topic category classification is performed.

3. The method of claim 2, wherein the external taxonomy includes an open directory project (ODP) (also known as Directory Mozilla (DMOZ)) in which general interest of a user is included.

4. The method of claim 2, wherein the determining of the query topic category and the determining of the document topic category comprise:
   generating a centroid vector using information expressing each topic category according to each topic category (a query topic category and a document topic category) stored in the external taxonomy;
   computing similarity according to a corresponding query topic category for the input query and similarity according to a corresponding document topic category for the document, based on the generated centroid vector; and
   determining a query topic category for the input query and a document topic category for the document, based on the computed similarity according to a corresponding query topic category and the computed similarity according to a corresponding document topic category.

5. The method of claim 4, wherein in generating the centroid vector, a centroid vector is generated using words included in corresponding snippet web documents belonging to each topic category.

6. The method of claim 1, wherein in deriving the weight, a category name and a relevance score for the classified query topic category are determined, a category name and a relevance score for the classified document topic category are determined, and a weight between a query topic category and a document topic category is derived based on the determined relevance scores.

7. The method of claim 1, wherein the generating of the topic category transition map comprises:
   converting the derived weight for the topic category transition into a transition probability value that a certain query topic category will transition to a certain document topic category or a transition probability value that a certain query will transition to a certain document topic category; and
   generating a topic category transition map as a result of analyzing topic category transition between a user query and a relevant document based on the converted query or document topic category transition probability value.

8. The method of claim 7, wherein the transition probability value that a certain query topic category will transition to a certain document topic category is computed by dividing a transition weight from a current query topic category to a certain document topic category by all transition weights derived from a current query topic category.

9. The method of claim 7, wherein the transition probability value that a certain query will transition to a certain document topic category is computed by adding all of probability values that each of a predetermined number of query topic categories as which a query can be classified will transition to a certain document topic category.

10. The method of claim 1, wherein in extracting the at least one representative keyword, a method of ranking representative keywords in documents collected according to each topic category is used.

11. A query expansion-based information retrieval method using query and document topic category transition analysis, comprising:

in a state in which a topic category transition map is generated as a result of analyzing topic category transition between a user query and a relevant document, and corresponding documents are generated as pseudo documents according to each topic category for the user query and the relevant document, determining a corresponding query topic category based on query and document text information for an input query input from a user;

allocating a relevant document topic category for the classified query topic category based on the topic category transition map;

ranking representative keywords for the query topic category and the relevant document topic category based on the pseudo documents;

expanding the input query using the ranked representative keywords; and retrieving corresponding documents using the expanded query.

12. The method of claim 11, further comprising providing a user with the retrieved documents according to a ranking of the representative keywords.

13. The method of claim 11, wherein in ranking the representative keywords, a representative keyword list according to a ranking is generated by including at least one document topic category having relevance for the allocated query topic category.

14. The method of claim 11, wherein in expanding the input query, the input query and the ranked representative keywords are synthesized based on simple merging or a synthesis weight.

* * * * *